(12) United States Patent
Elsarelli

(10) Patent No.: US 11,827,133 B2
(45) Date of Patent: Nov. 28, 2023

(54) POWERED CONSOLE WITH MANUAL RELEASE

(71) Applicant: Brose Fahrzeugteile SE & Co. Kommanditgesellschaft, Coburg, Coburg (DE)

(72) Inventor: James Elsarelli, Leonard, MI (US)

(73) Assignee: BROSE FAHRZEUGTEILE SE & CO. KOMMANDITGESELLSCHAFT, COBURG, Coburg (DE)

( * ) Notice: Subject to any disclaimer, the term of this patent is extended or adjusted under 35 U.S.C. 154(b) by 297 days.

(21) Appl. No.: 17/189,655

(22) Filed: Mar. 2, 2021

(65) Prior Publication Data
US 2022/0282543 A1 Sep. 8, 2022

(51) Int. Cl.
*B60N 2/75* (2018.01)
*B60R 7/04* (2006.01)
*B60R 11/00* (2006.01)

(52) U.S. Cl.
CPC ............. *B60N 2/773* (2018.02); *B60N 2/793* (2018.02); *B60R 7/04* (2013.01); *B60R 11/00* (2013.01); *B60R 2011/0007* (2013.01); *E05Y 2201/474* (2013.01); *E05Y 2201/654* (2013.01); *E05Y 2201/664* (2013.01); *E05Y 2201/68* (2013.01); *E05Y 2201/686* (2013.01); *E05Y 2201/716* (2013.01); *E05Y 2201/722* (2013.01); *E05Y 2800/11* (2013.01); *E05Y 2900/538* (2013.01)

(58) Field of Classification Search
CPC .......... B60N 2/773; B60N 2/793; B60R 7/04; B60R 11/00; B60R 2011/0007

USPC .............................................. 296/24.34, 37.8
See application file for complete search history.

(56) References Cited

U.S. PATENT DOCUMENTS

| | | | | |
|---|---|---|---|---|
| 6,752,444 | B2 * | 6/2004 | Kitano | ................ B60R 11/0211 296/65.09 |
| 11,279,293 | B2 * | 3/2022 | Razvi | ...................... E05B 83/32 |
| 11,305,698 | B2 * | 4/2022 | Atang | ........................ B60R 7/04 |
| 11,505,094 | B2 * | 11/2022 | Kang | ..................... B60N 2/793 |
| 2008/0290680 | A1 * | 11/2008 | Busha | .................... B60N 3/101 296/24.34 |
| 2014/0175820 | A1 * | 6/2014 | Lechkun | .................. B60N 2/78 49/41 |

(Continued)

FOREIGN PATENT DOCUMENTS

WO 2020040767 A1 2/2020

*Primary Examiner* — Amy R Weisberg
*Assistant Examiner* — Melissa Ann Bonifazi
(74) *Attorney, Agent, or Firm* — Dickinson Wright PLLC

(57) ABSTRACT

A console assembly for use in a vehicle provided with a floor. The console assembly includes a guide member, coupled to the vehicle floor, a moving portion, a gearbox assembly, a transmission assembly, and a disengaging device. The gearbox assembly includes a gear configured to rotate about a rotational axis in a first rotational direction and a second rotational direction to move the moving portion between a first position and a second position. The transmission assembly is configured to operate in a number of operating states, including an engaged state and a disengaged state. The disengaging device is configured to change the operating state of the transmission assembly between the engaged state and the operating state so that the moving portion is movable while the transmission assembly is in the disengaged state.

20 Claims, 11 Drawing Sheets

(56) References Cited

U.S. PATENT DOCUMENTS

| | | | |
|---|---|---|---|
| 2016/0152163 A1* | 6/2016 | Strasdat | B60N 2/24 296/64 |
| 2019/0315281 A1* | 10/2019 | Lee | B60R 7/04 |
| 2020/0156553 A1* | 5/2020 | Kang | B60N 2/14 |
| 2020/0276937 A1* | 9/2020 | Harris | B60R 7/04 |
| 2021/0086699 A1* | 3/2021 | Chen | B60R 7/04 |
| 2021/0245666 A1* | 8/2021 | Atang | B60R 7/04 |
| 2021/0309156 A1* | 10/2021 | Hartmann | B60R 7/04 |

* cited by examiner

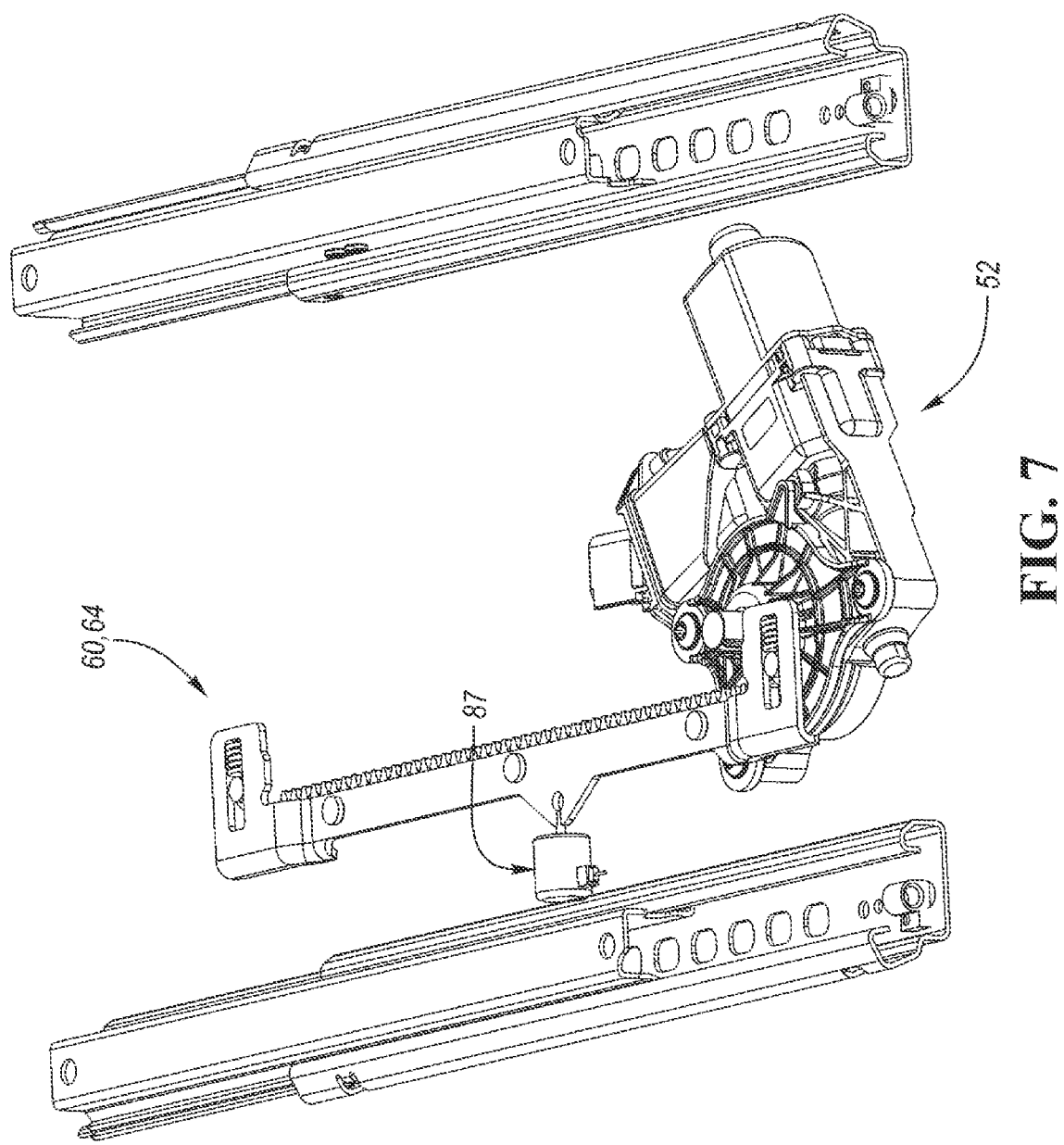

POWERED CONSOLE WITH MANUAL RELEASE

TECHNICAL FIELD

The present disclosure relates to interior storage compartments for vehicles. More specifically, the disclosure relates to a movable center console.

BACKGROUND

Larger vehicles, such as sport utility vehicles or vans may include first, second, and third rows of seats within the vehicle cabin. The various rows of seats may be bench seats, one continuous seat, or two individual seats that are spaced apart from one another. Generally, the two seats of the first row or front row are disposed on either side of a center console assembly. A fixed center console between two individual seats in the second row would block ingress to the third row of seats from the vehicle cabin.

Center consoles serve several purposes such as providing storage, housing climate controls and entertainment features.

SUMMARY

According to one embodiment, a console assembly for use in a vehicle provided with a floor, is provided. The console assembly may include a guide member, that may be coupled to the vehicle floor, a moving portion, a gearbox assembly, a transmission assembly, and a disengaging device. The gearbox assembly may include a gear that may be configured to rotate about a rotational axis in a first rotational direction and a second rotational direction to move the moving portion between a first position and a second position. The transmission assembly may be configured to operate in a number of operating states, including an engaged state and a disengaged state. The disengaging device may be configured to change the operating state of the transmission assembly between the engaged state and the operating state so that the moving portion is movable while the transmission assembly is in the disengaged state.

According to another embodiment, a console assembly for use in a vehicle, is provided. The console assembly may include a guide member, a rack, a moving portion, a gearbox assembly, and a disengaging device. The rack may define a plurality of teeth and the moving portion may be coupled to the rack and configured to move along the guide between a first position and a second position. The gearbox assembly may include a pinion that may be configured to rotate about a rotational axis in a first rotational direction and a second rotational direction to move the moving portion between a first position and a second position. The disengaging device may be configured to move the rack and selectively disengage one or more teeth of the plurality of teeth from the pinion, so that the carrier is movable along the guide while one or more teeth of the plurality of teeth are selectively disengaged from the pinion.

According to yet another embodiment, a console assembly is provided. The console assembly may include a guide member, a moving portion, a gearbox assembly, a transmission assembly, a disengaging device, and a controller. The moving portion may be configured to move along the guide member between a first position and a second position. The gearbox assembly may include a gear and a motor that may be configured to rotate the gear about a rotational axis in a first rotational direction and a second rotational direction to move the moving portion between the first position and the second position. The transmission assembly may be configured to operate in a number of operating states including an engaged state and a disengaged state. The disengaging device may be configured to actuate and change the operating state of the transmission assembly between the engaged state and the operating state so that the moving portion is movable. The controller may be configured to, responsive to movement of the moving portion from the second position to the first position or another position disposed between the first and second positions, store position data indicative of a position of the moving portion.

BRIEF DESCRIPTION OF THE DRAWINGS

FIG. 7 illustrates a top-perspective view of a portion of the console assembly according to one or more embodiments.

DETAILED DESCRIPTION

Figure 1:
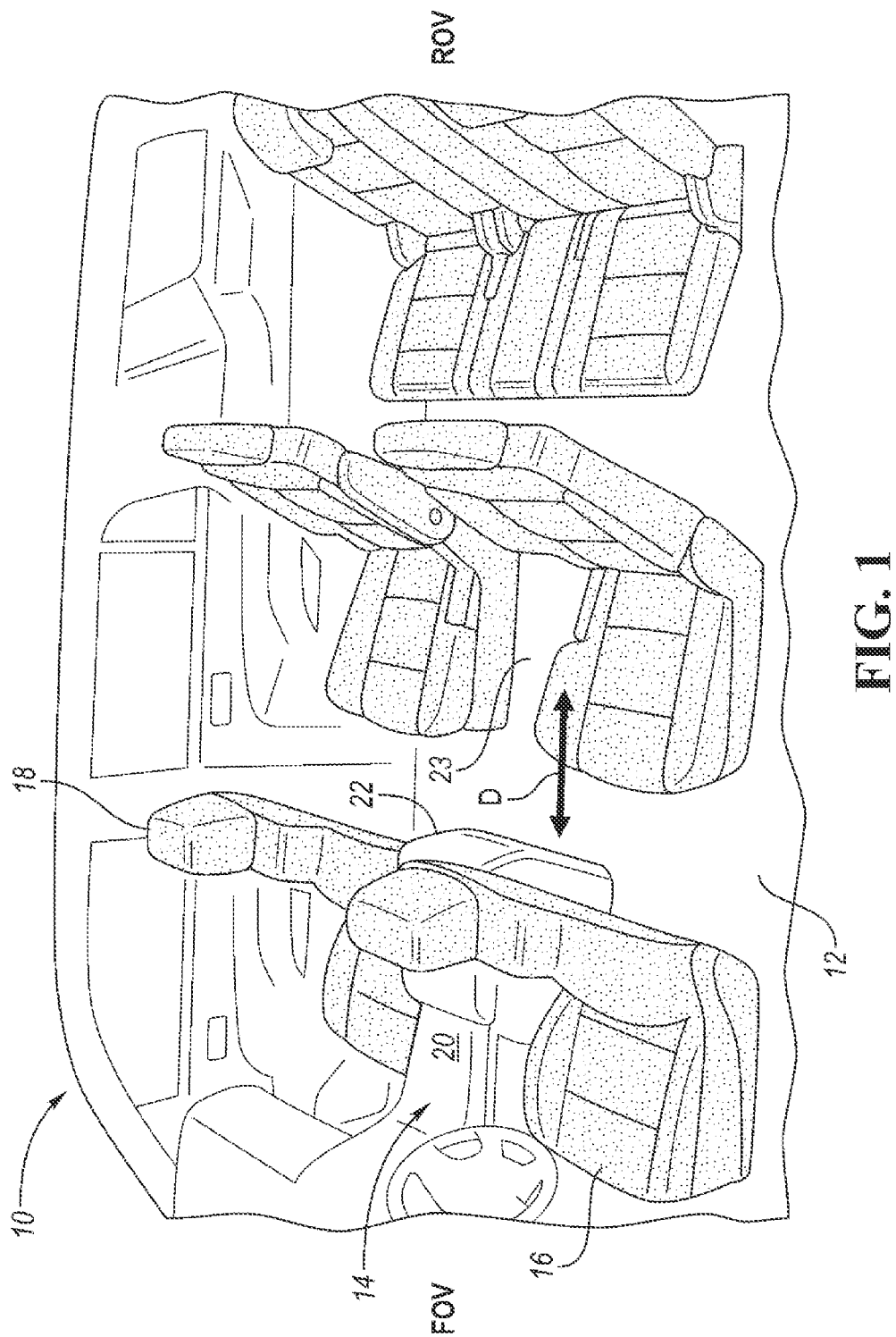
FIG. 1 illustrates an exemplary vehicle cabin including an interior assembly such as a console assembly.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Known console assemblies are provided in WO 2020/040767, US 2020/0276937 A1, and U.S. Ser. No. 16/786,611, all of which are hereby incorporated by reference in their entirety.

FIG. 1 illustrates a vehicle 10, in particular, a vehicle cabin that includes a vehicle floor 12 and a console assembly 14 that is attached (directly or indirectly) to the floor 12. The console assembly 14 includes a fixed portion 20 and a moving or translating portion 22. In one embodiment, the moving portion 22 of the console assembly 14 may be coupled to and move along an elongated cavity such as a slot or track formed within the floor 12. Here, console assembly 14 is disposed in a forward position, between a driver's seat 16 and a passenger seat 18. The translating portion 22 may be powered to move along a longitudinal direction, represented by the directional arrow D, to a rearward or deployed position disposed within or adjacent to a space 23 between rear seats of the vehicle 10.

When powered, the moving portion 22 may move at a powered operation speed ranging between 25-75 millimeters per second. Under certain circumstances, a user may wish to move the moving portion 22 more quickly than the powered operation speed. For example, if the moving portion 22 is positioned so that a passenger attempting to exit the vehicle from one of the rear seats through the space 23, the passenger may initiate manual movement of the moving portion and adjust the same from the rearward to the forward position. As another example, a user sitting in one of the rear seats may wish to access the moving portion 22 relatively quickly and initiate manual movement of the moving portion 22 from the forward position to the rearward position.

Referring generally to the figures, the console assembly 14 may include a guide member 50 that may be attached, directly or indirectly, to the vehicle floor 12 and a gearbox assembly 52 configured to move the moving portion 22 along the guide member 50 between a first position and a second position. The gearbox assembly 52 may include a motor 26 and a gear or a pinion 58 that may be rotate about a rotational axis A in a first rotational direction or a second rotational direction to move the moving portion 22. As an example, the moving portion 22 may translate between a retracted position, such as lying against or adjacent to the fixed portion 20, and a deployed position, such as between or adjacent to the second row of seats shown in FIG. 1.

The console assembly 14 may include a transmission assembly 60 that may be configured to operate in a number of operating states, such as an engaged state and a disengaged state. In the engaged state, the transmission assembly 60 engages the gearbox assembly 52 and in the disengaged state, the transmission assembly 60 is disengaged from the gearbox assembly 52.

The console assembly 14 may include a disengaging device 62 that may be configured to change to the operating state of the transmission assembly 60 between the engaged state and the disengaged state. The transmission assembly 60 may be coupled to or fixed to the moving portion 22 and when the disengaging device 62 changes the operating state of transmission assembly 60 to the disengaged state, the moving portion 22 is movable to a desired position. For instance, in the disengaged state, a user may move the moving portion by hand to a desired position. As another example, the console assembly 14 may include another mechanism that may move the moving portion 22 in response to the transmission assembly 60 changing to the disengaged state.

As an example, the transmission assembly 60 may include a rack 64 that may include a plurality of teeth 66. The rack 64 may have an elongated shape, having a length that is greater than a width of the rack 64. When the rack 64 is in the engaged state, one or more of the plurality of teeth 66 may be engaged with or contact the gear 56 or pinion 58. And when the rack 64 is in the disengaged state, one or more of the plurality of teeth 66 may be disengaged from or not contact the gear 56 or pinion 58 of the gearbox assembly 52. In one or more embodiments, the rack 64 may move in a direction that may be transverse to the rotational direction as the rack 64 moves between the engaged state to the disengaged state. As another example, the rack 64 may pivot or rotate between the engaged state and the disengaged state.

The console assembly 14 may include a mounting member (not illustrated) such as a rail or a mounting bracket that may be fixed to the vehicle floor 12 and support the guide member 50. A number of pins 104 may extend from the mounting member and the rack 64 may move, e.g., rotate or translate, about the pin as the rack moves between the engaged state and the disengaged state. One or more springs 114 may be disposed between the rack 64 and the moving portion 22 to bias the rack 64 towards the engaged state and the disengaged state.

In one or more embodiments, the gearbox assembly 52 may move away from the transmission assembly 60 or rack 64 so that the transmission assembly 60 changes to the disengaged state. As another example, the transmission 60 may include a clutch that may be selectively engageable so that when the moving portion 22 is moved and the clutch is disengaged, a freewheel mechanism, the motor, or both rotate. This rotation may be measured and the position of the moving portion 22 may be calculated based on the rotational movement of the motor or freewheel mechanism.

For the purposes of succinctness, certain components that are common to one or more embodiments or figures may only be described once in the present disclosure.

Figure 2:
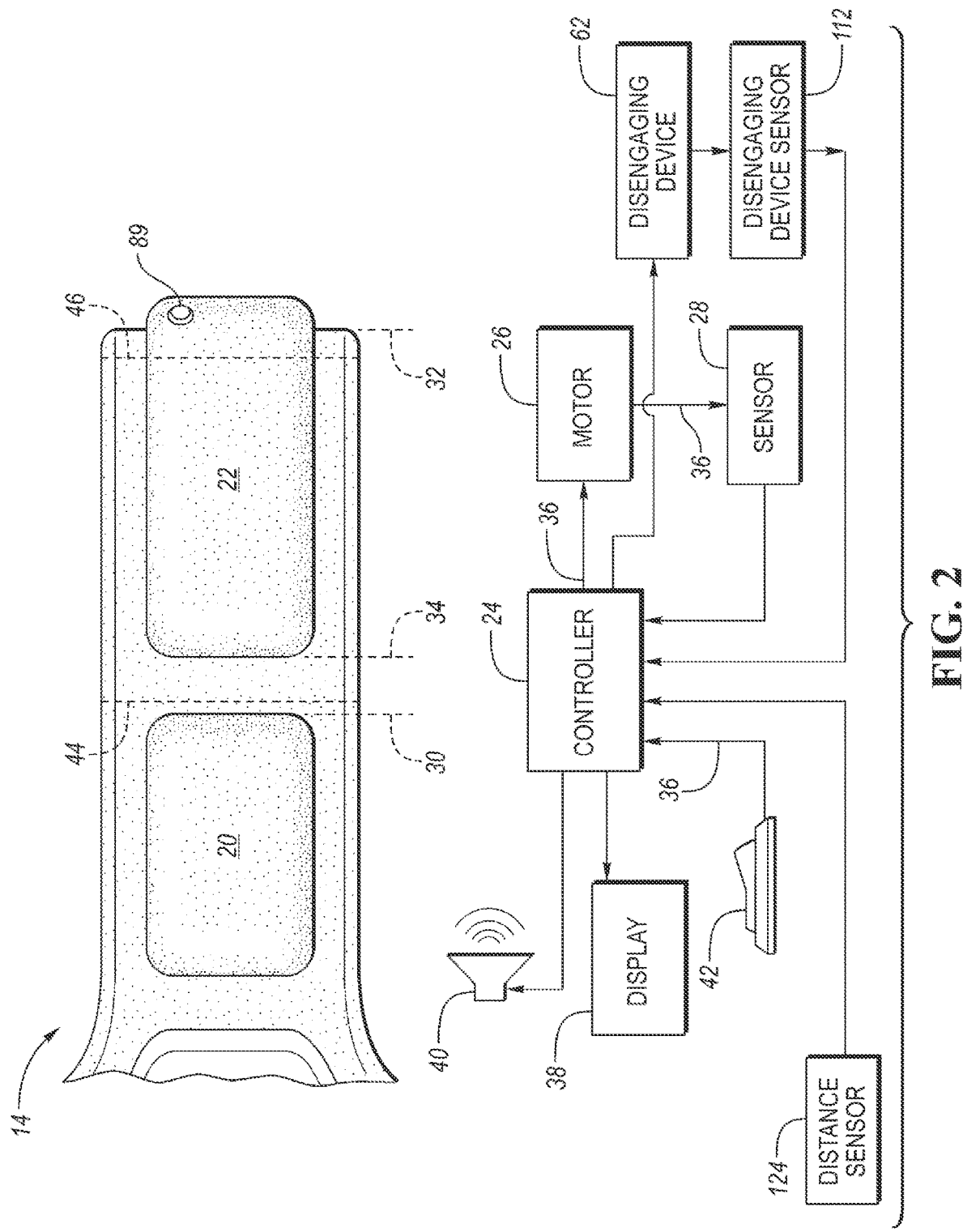
FIG. 2 illustrates an exemplary schematic diagram for an interior assembly such as the console assembly.

FIG. 2 illustrates a schematic diagram of console assembly 14 and examples of associated hardware. The moving portion 22 of the console assembly 14 may be moved by actuation of a motor 26. The motor 26 may be configured to move with the moving portion 22 or it may be mounted so that it is stationary with respect to the moving portion 22. The moving portion 22 may move e.g., translate between a first position 30 and a second position 32. As one example, the moving portion 22 may have one or more reference points 34 that may be used when evaluating the relative position of the moving portion 22 with respect to the first position 30 and the second position 32. As illustrated, the moving portion 22 is in an intermediary position, spaced apart from the first position 30 and the second position 32, with respect to the reference point 34. The first position 30 and the second position 32 may each be referred to or formed by end stops. For example, as the moving portion 22 is moved to a position that is adjacent to or lies against the fixed portion 20, at least a portion of the moving portion 22 may engage the first end stop at the first position 30.

In one or more embodiments, the motor 26 and moving portion 22 may vary in speed between as the moving portion moves between the first and second positions 30, 32. For example, when the moving portion 22 is within a predetermined distance of the first position 30, as represented by the dashed line 44, or when the moving portion 22 is within a predetermined distance of the second position 32, as represented by the dashed line 46, the moving portion may decelerate.

The motor 26 may communicate with a controller 24 that may provide signals 36 to control the motor 26. For example, the signals 36 may command the motor 26 to stop, reverse directions, increase or decrease speed etc. A console switch 42 may be operatively connected to the controller 24 and in response to actuation of the switch 42, the controller 24 may command the motor 26 to actuate the gearbox assembly 52 to move the moving portion 22. In one or more embodiments, the controller 24 may be incorporated in the motor 26 as an ECU or the controller 24 may be separate from the motor 26. One or more sensors 28 may be provided to monitor the motor 26. As one example, the sensor 28 may be a hall effect sensor configured to recognize hall pulses generated by the motor 26. The hall pulses may represent motor position increments. The motor position increments may be communicated 36 to the controller 24.

The controller 24 may be configured to operate in a normalized state and a de-normalized state. The controller 24 may change from the normalized state to the de-normalized state under certain conditions that may make detecting a pinch condition more difficult. As one example of such a condition, there may be an absence of location data of the moving portion 22 relative to one or more reference positions, such as the end stops 30, 32. When the controller 24 is in the de-normalized state, the controller 24 may alter operating parameters of the motor 26 and programs, such as algorithms, stored in the controller 24. In one or more embodiments, the controller 24 may be configured to send signals to alert users, such as passengers or drivers of the vehicle, of the de-normalized state and increased risk of a pinch condition.

In one or more embodiments, a display 38 may be operatively connected to the controller 24. The display 38 may be disposed in the console assembly 14. As another example, the display 38 may be provided by an entertainment module, e.g., television, that may be attached to one of the seats or the ceiling in cabin. Alternatively, the display 38 may be provided in the dashboard or other human-machine-interface disposed in the vehicle cabin. In response to the controller 24 operating in the de-normalized state, the controller 24 may send signals to the display 38 to alert the user of the de-normalized state. As an example, a speaker 40 may be operatively connected to the controller 24. And in response to the controller 24 operating in the de-normalized state, the controller 24 may send signals to the speaker 40 to provide an audible warning to occupants or users.

The disengaging device 62 may be operatively connected to the controller 24 so that in response to a receiving a command to move the moving portion 22 without actuating the gearbox assembly 52, the controller 24 may command the disengaging device 62 to change from the engaged state to the disengaged state. A disengaging device sensor 112 may be operatively connected to a handle 78, or the disengaging device 62. The disengaging device sensor 112 may communicate to the controller 24 that disengaging device 62 has changed operating states. Such communication may trigger the controller 24 to delete or erase the recorded position data.

A distance sensor 124 may be fixed to the moving portion 22 to measure a distance between the moving portion 22 and the fixed portion 20. As an example, the distance sensor 124 may be a radar sensor, ultrasonic sensor, proximity sensor, or a linear variable displacement transducer.

While the console assembly 14 illustrated includes a translating moving portion 22, the present disclosure may apply to a console assembly that may include a moving portion that pivots, rotates, or moves in a non-translatable manner.

Figure 3:
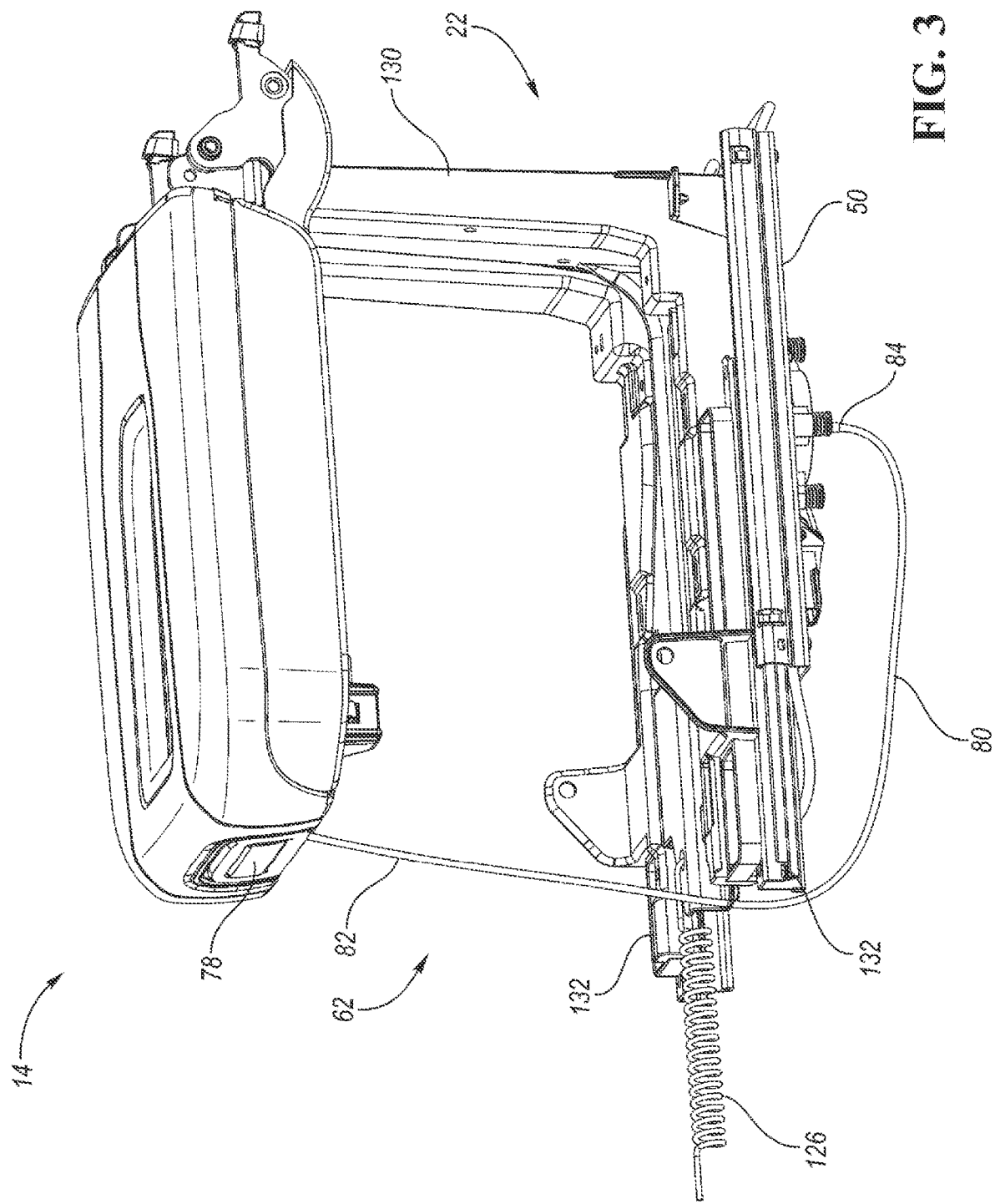
FIG. 3 illustrates a perspective view of a portion of the console assembly according to one or more embodiments.

FIG. 3 illustrates a top-perspective view of a portion of the console assembly 14. For the purposes of clarity, the receptacle attached to the moving portion 22 is not illustrated. The moving portion 22 may include a carrier 130, that may carry the receptacle, and rails 132 that carry the carrier 130. The moving portion 22 may include an actuation member such as the handle 78 and a disengaging cable 80, such as a Bowden cable, that may include a first end 82, that may be attached to the handle 78, and a second end 84 that may be attached to either the transmission assembly 60 or the gearbox assembly 52. As the handle 78 is actuated, the cable 80 may be pulled so that either the transmission assembly 60 or the gearbox assembly 52 moves to create space between the transmission assembly 60 and the gearbox assembly 52 so that the transmission assembly 60 is in the disengaged state.

In one or more embodiments, a return spring 126 may be disposed between the moving portion 22 and the fixed portion 20 (FIG. 2). Once the disengaging device 62 changes the operating state of the transmission assembly 60 to the disengaged state, return spring 126 may bias the moving portion 22 so that the moving portion 22 is moved towards the fixed portion 20. The return spring 126 may be used in a console assembly 14 that includes a drum housing 86 (FIG. 4) or the rack 64 (FIG. 5A).

Figure 4:
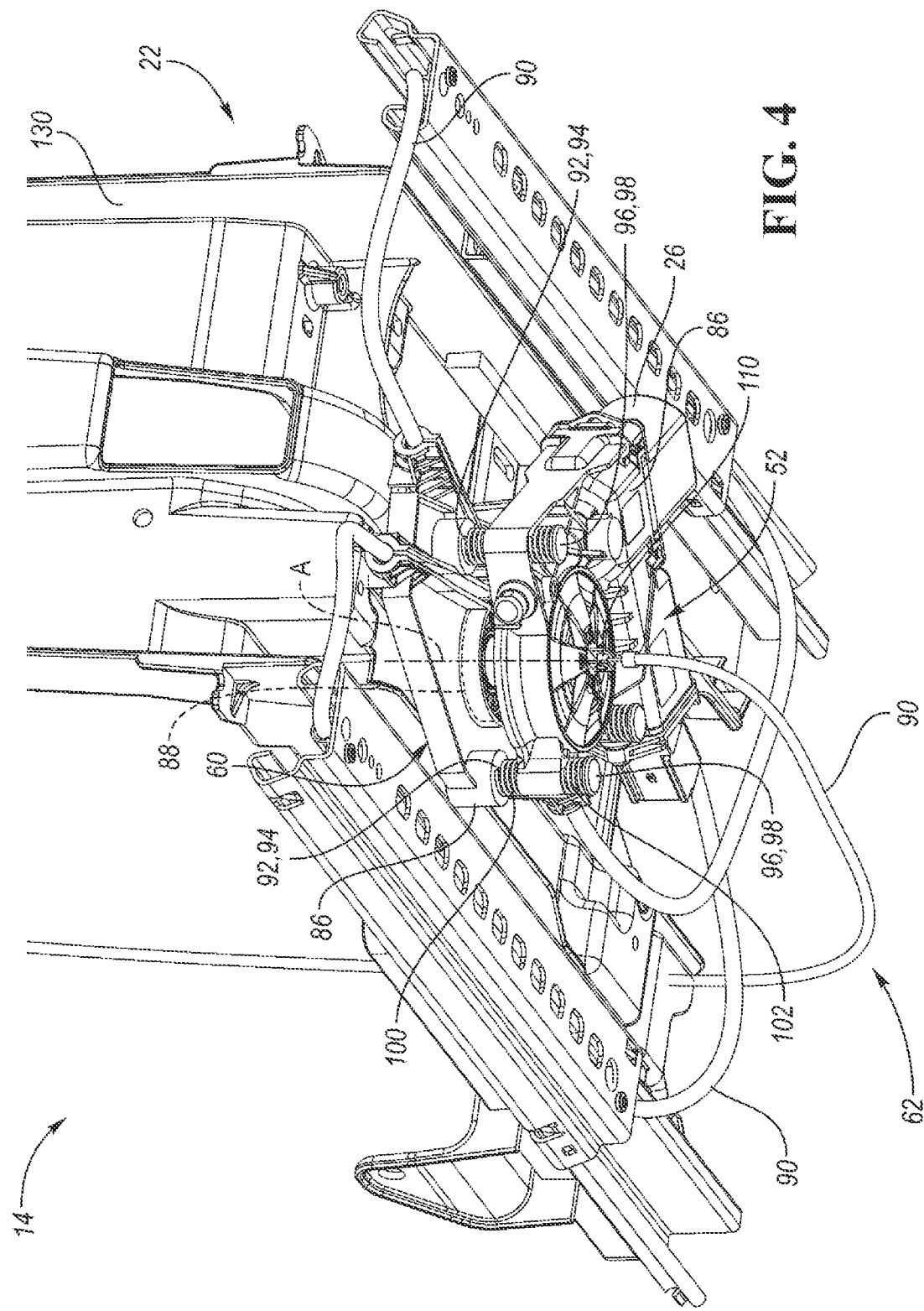
FIG. 4 illustrates a bottom-perspective view of a portion of the console assembly according to one or more embodiments.
Figure 5A:
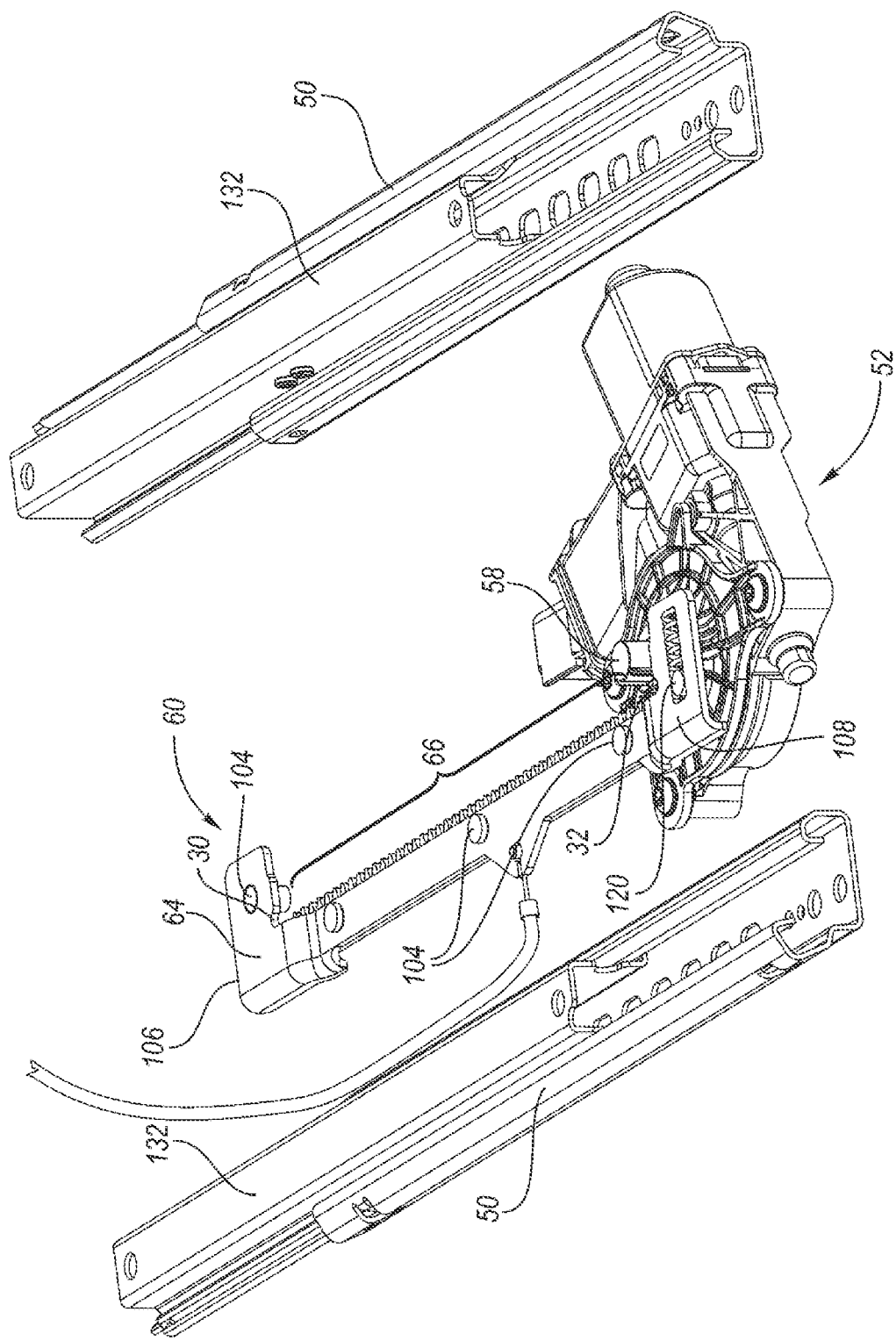
FIG. 5A illustrates a top-perspective view of a portion of the console assembly according to one or more embodiments.

FIG. 4 illustrates a bottom-perspective view of a portion of the console assembly 14. In one or more embodiments, the transmission assembly 60 may include the drum housing 86 and a cable drum 88 that may be disposed in the drum housing 86. Here, the drum housing 86 is spaced apart from the gearbox assembly 52 and is in the disengaged state. One or more cables 90 may extend between the moving portion 22 and the drum housing 86. As the cable drum 88 rotates, the cables 90 may be wound about the cable drum 88 and pull the moving portion 22 in either the first or second directions.

As an example, the drum housing 86 may be fixed to the moving portion 22 by a number of rods 92 that may extend from the moving portion 22, or the drum housing 86, or both. The rod 92 may include a first end 94, that may be disposed within or coupled to the drum housing 86, and a second end 96 that may include a flange 98. The gearbox assembly 52 may include a cable attachment feature such as a tab that may define an aperture 110 configured to receive the second end 84 of the cable 80. As an example, the cable attachment feature and aperture 110 may be aligned with the rotational axis A and a force applied by the cable 80 may extend along the rotational axis A.

A first spring 100 may be disposed between the drum housing 86 and the gearbox assembly 52 and a second spring 102 may be disposed between the flange 98 and the gearbox assembly 52. As the cable 80 is retracted, the second spring 102 compresses and the first spring 100 extends and biases the gearbox assembly 52 away from the drum housing 86. The second spring 102 may bias the gearbox assembly 52 towards the drum housing 86 so that the drum housing 86 is in the engaged state when the cable 80 is not retracted. In other words, releasing the handle 78 may provide slack to the cable 80 and the second spring 102 may return the gearbox assembly 52 to an engaged position so that the gearbox assembly 52 engages the drum housing 86.

For the purposes of clarity, FIGS. 5A-5C, FIG. 6, and FIG. 7 do not show the carrier 130.

Figure 5C:
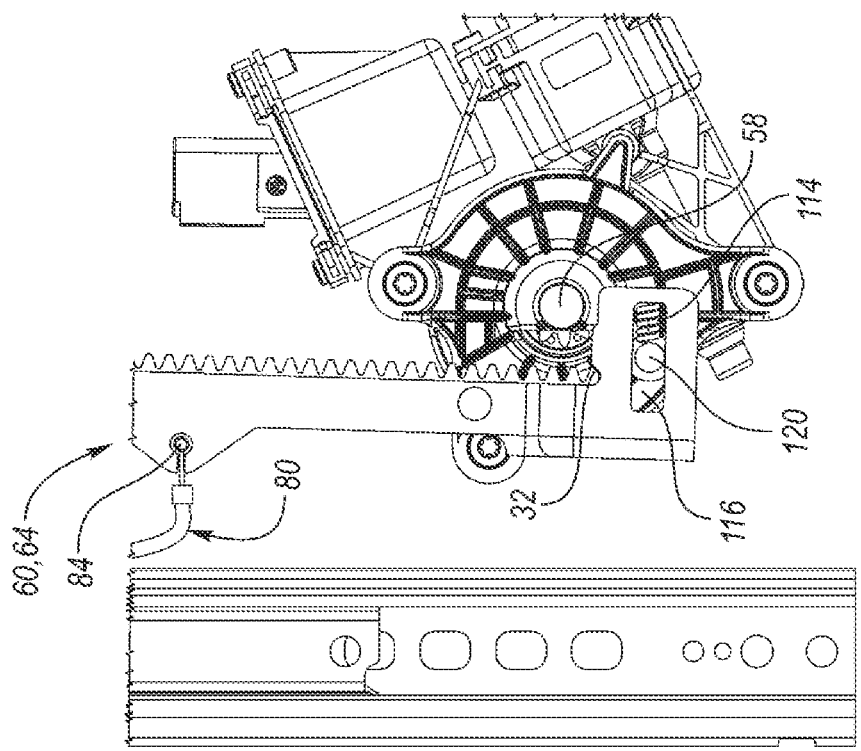
FIG. 5B-5C illustrate a top-plan view of a portion of the console assembly, according to one or more embodiments, in an engaged state and a disengaged state, respectively.
Figure 5B:
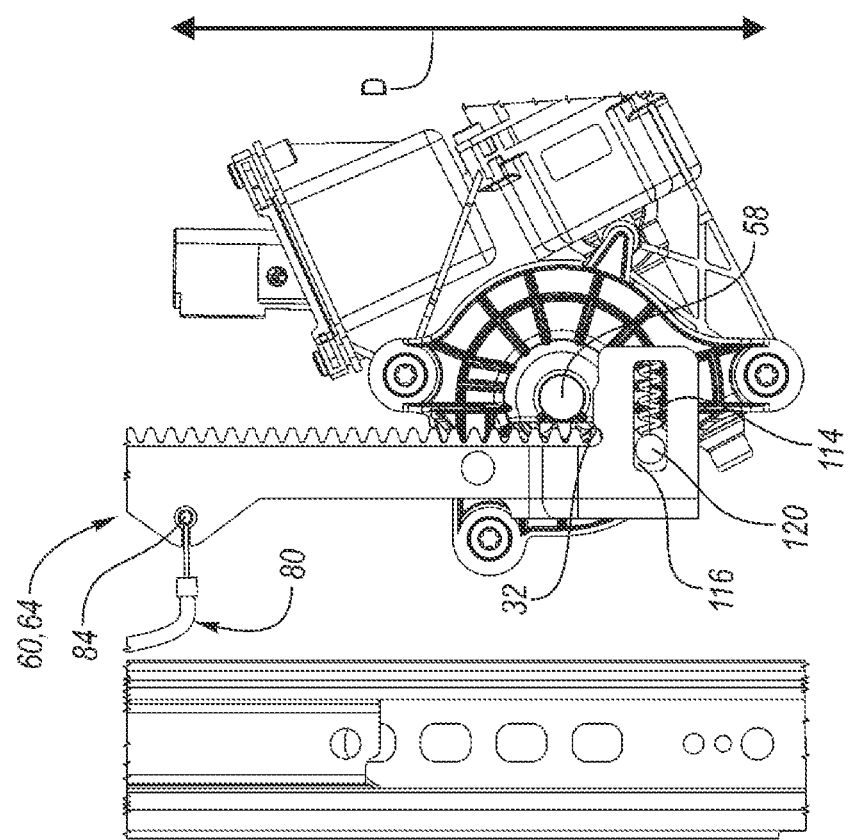

FIG. 5A illustrates a perspective view of a portion of the console assembly 14. FIG. 5B and FIG. 5C illustrate a top-plan view of a portion of the console assembly, according to one or more embodiments, in an engaged state and a disengaged state, respectively. The transmission assembly 60 may include the rack 64 that may be fixed to one or more portions of the moving portion 22, such as the carrier 130 (FIG. 3) by the pin 104. The rack 64 may be configured to pivot about the pin 104 so that the rack 64 moves from the engaged position to the disengaged position and vice-versa (FIG. 5B). As an example, the rack 64 may pivot between 5 and 30 degrees. In one or more embodiments, the rack 64 may include a first end 106 and a second end 108 and the pin 104 may be disposed in the first end 106 and the second end 108. Accordingly, the rack 64 may pivot about the pin 104 disposed near the first end 106 to move along a slot 116 to the disengaged state so that the pinion 58 is spaced apart from the teeth 66 (FIG. 5C).

Figure 6A:
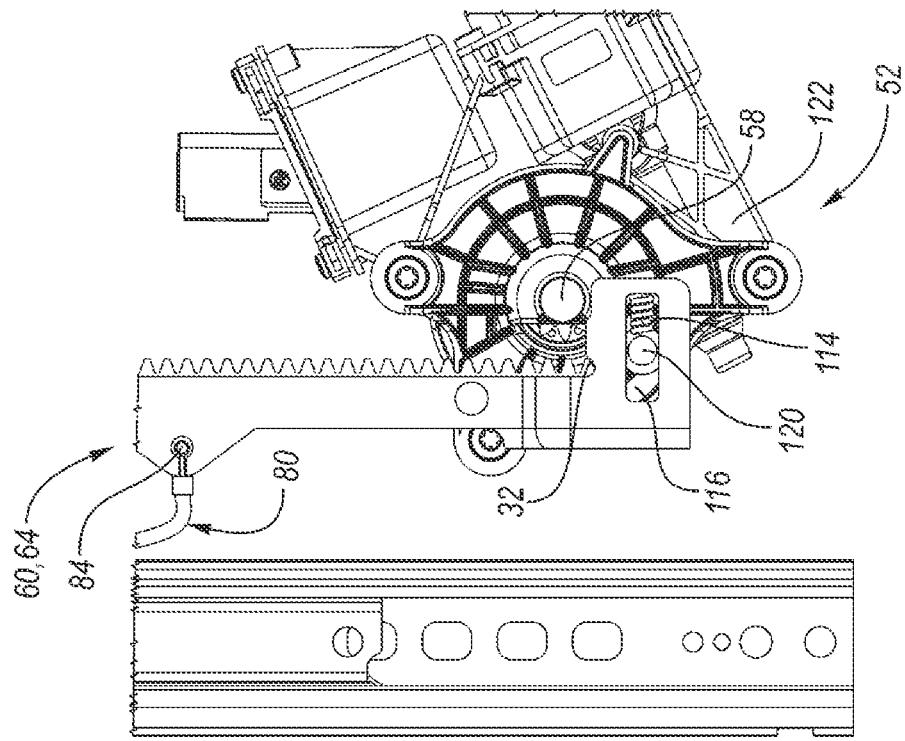
FIG. 6A-6B illustrate a top-plan view of a portion of the console assembly, according to one or more embodiments, in an engaged state and a disengaged state, respectively.
Figure 6B:
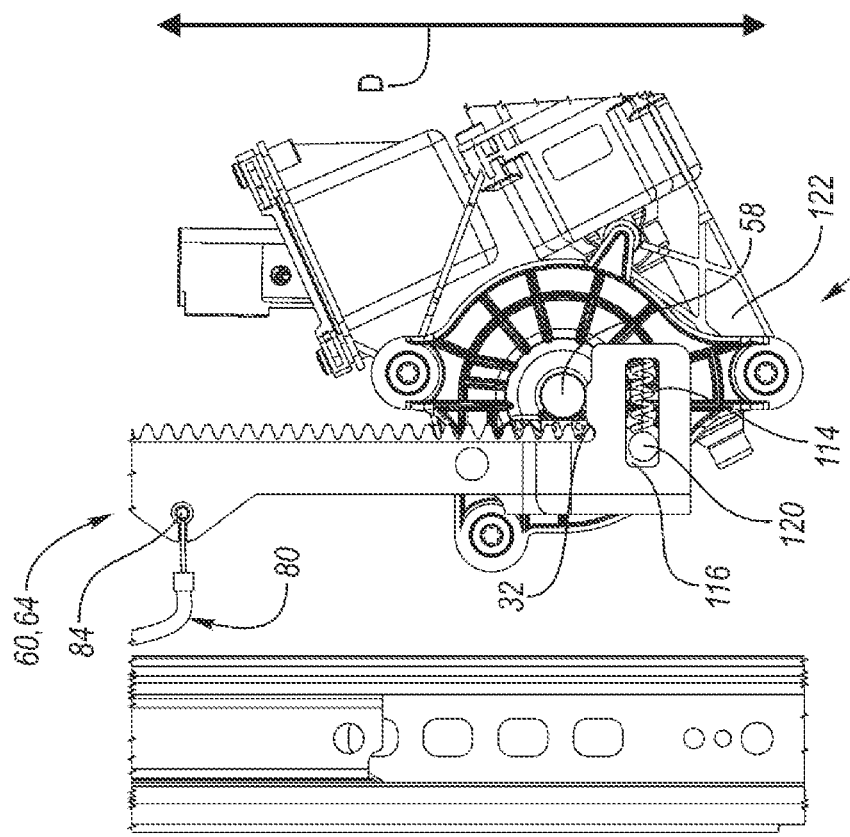

FIG. 6A illustrates a portion of the console assembly 14, including the transmission assembly 60, such as the rack 64 in the engaged state. The rack 64 includes a slot 116 that may extend in a direction that may be substantially transverse to the longitudinal direction D. The gearbox assembly 52 may include a gearbox housing 122 and a pin 120 may extend from the gearbox housing 122, or the transmission assembly 60, or the moving portion 22. A spring 114 may extend between an end of the slot 116 and the pin 120 so that the rack 64 is biased towards the pinion 58 so that the transmission assembly 60 is in the disengaged state (FIG. 6B).

FIG. 7 illustrates a perspective view of a portion of the disengaging device 62 and the transmission assembly 60. In one or more embodiments, the disengaging device 62 may include an electro-mechanical actuator, such as a solenoid 87 and the actuation member may be a button 89 (FIG. 2) that may be operatively connected to the solenoid 87. In response to actuation of the button 89, the solenoid may retract or extend to move either the transmission assembly 60 or the gearbox assembly 52 to create space between the transmission assembly 60 and the gearbox assembly 52 and change the transmission assembly 60 to the disengaged state.

Figure 8A:
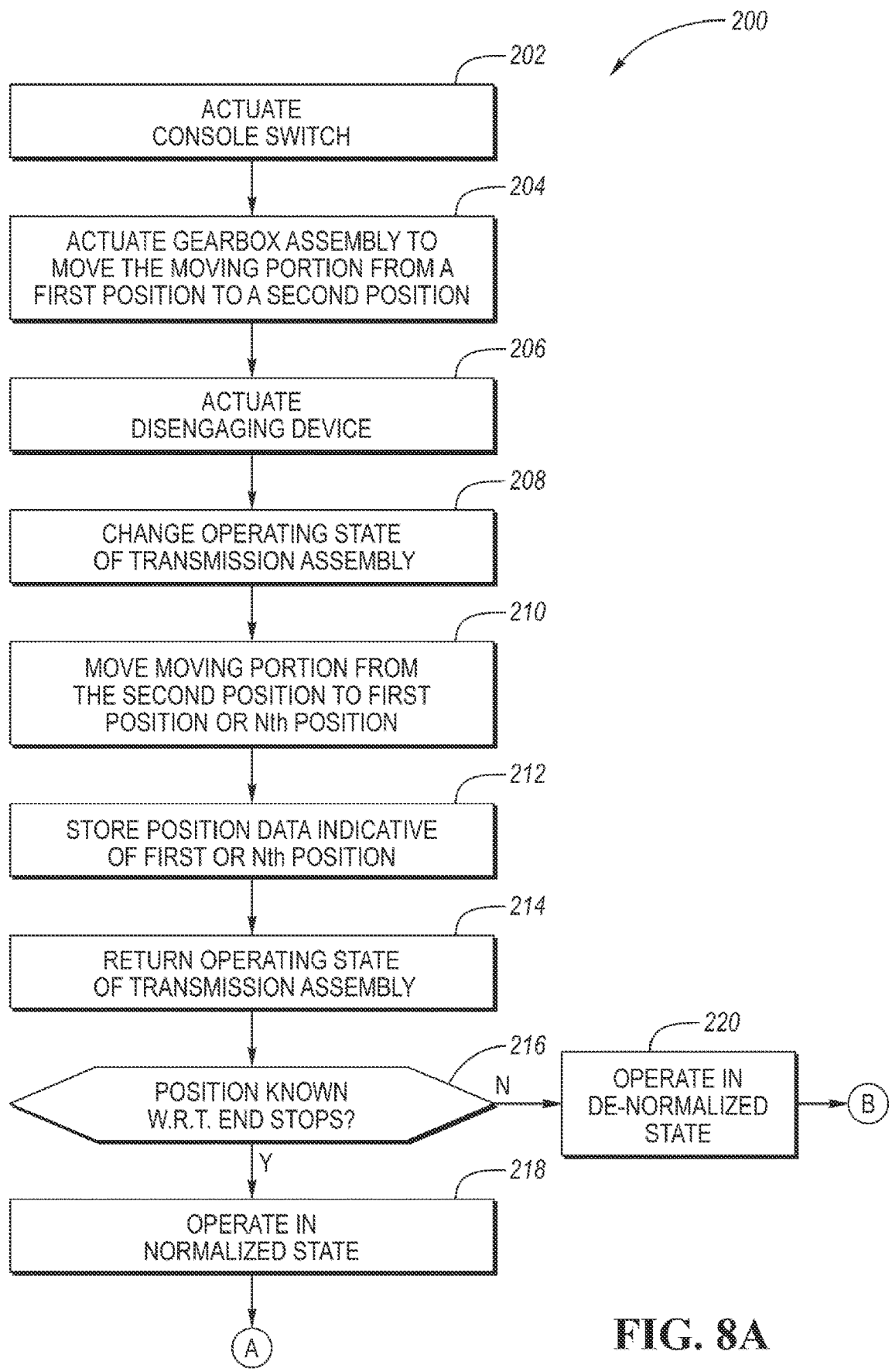
FIGS. 8A-8B is a flow chart representative of a control strategy and/or logic that may be implemented using one or more processing strategies as the console assembly operates.
Figure 8B:
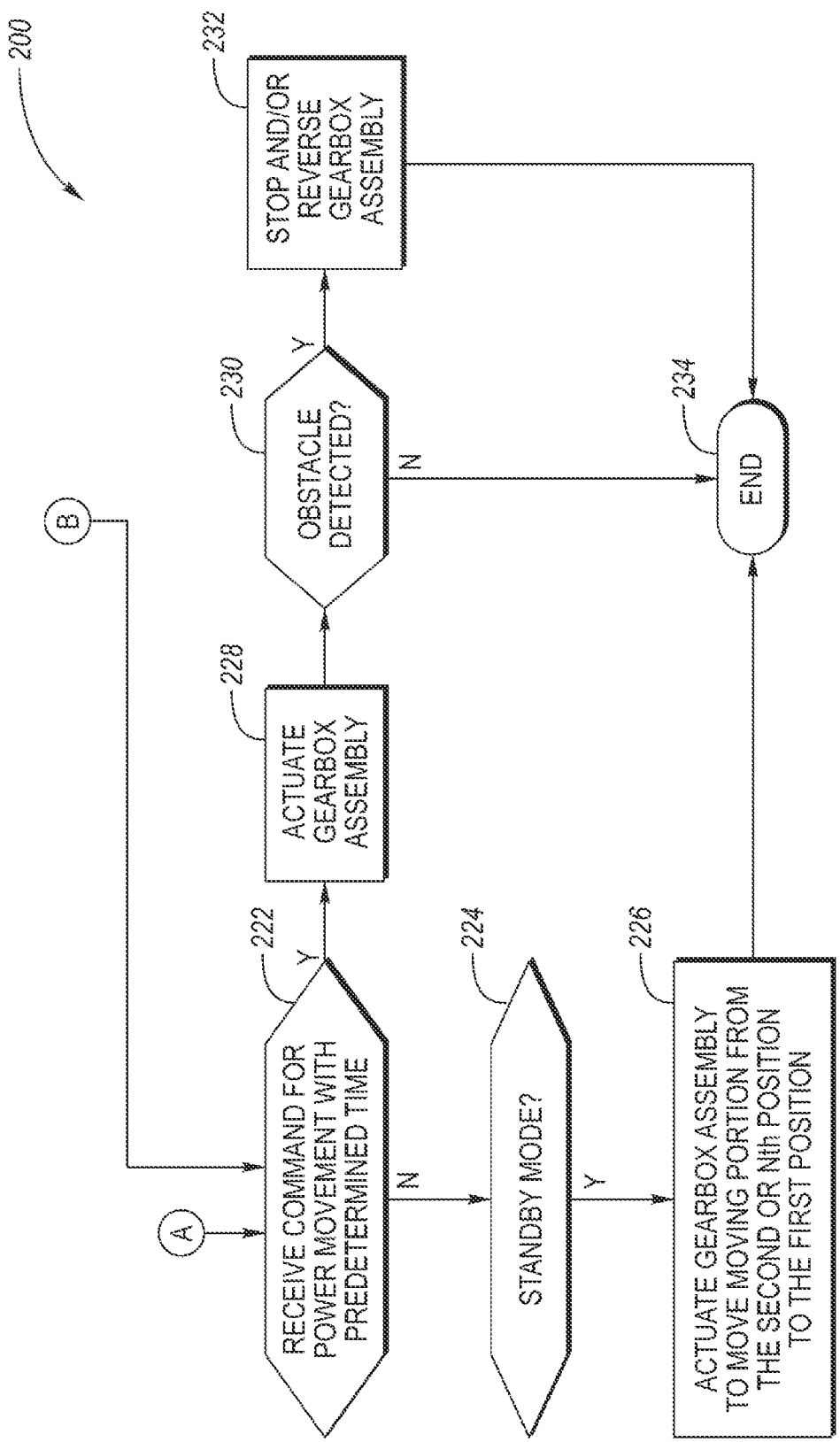

Control logic or functions performed by the controller 24 may be represented by flow charts or similar diagrams, such as the flow chart 200 in FIG. 8A and FIG. 8B. FIGS. 8A-8B provides a representative control strategy and/or logic that may be implemented using one or more processing strategies such as polling, event-driven, interrupt-driven, multi-tasking, multi-threading, and the like. As such, various steps or functions illustrated may be performed in the sequence illustrated, in parallel, or in some cases omitted.

The controller 24 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 24 in controlling one or more assemblies within the vehicle interior.

Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein but is provided for ease of illustration and description. The control logic may be implemented primarily in software executed by a microprocessor-controlled vehicle, motor 26, or controller 24 illustrated in FIG. 2.

The control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of several known physical devices that utilize electric, magnetic, and/or optical storage to keep executable instructions and associated calibration information, operating variables, and the like.

The control strategy may start in response to one or more trigger events represented by operation 202 or operation 204, or both. An occupant or user may actuate the console switch 42 and the controller 24 may command the motor 26 to actuate the gearbox assembly 52 to move the moving portion 22 from the first position 30 to the second position 32, as represented by operations 202 and 204.

A user or occupant may actuate the disengaging device 62 by actuating the handle 78 or the button 89, as represented by operation 206, and the disengaging device 62 then changes operating states from the engaged operating state to the disengaged operating state, as represented by operation 208. In response to operation 208, the disengaging device sensor 112 may provide signals to the controller 24 indicating that the transmission assembly 60 is in the disengaged state. As an example, in response to the transmission assembly 60 changing to the disengaged state, the controller 24 may branch to operation 216 to determine whether the controller 24 contains location data indicative of the position of the moving portion 22 with respect to the fixed portion 20. In other words, the controller 24 may assume that the moving portion 22 is being or will be moved while the transmission assembly 60 is in the disengaged position.

As shown in operation 210, when the transmission assembly 60 is in the disengaged state, the return spring 126 may bias the moving portion 22 towards the fixed portion 20. In another embodiment, the user or occupant may move the moving portion 22 by pushing or pulling the moving portion towards or two the first and second positions 30, 32. The moving portion 22 may be moved from the second position 32 or another position disposed between the first and second positions 30, 32 to the first position 30. And the controller 24 may store position data of the moving portion 22 as an assumed position, as represented by operation 212.

After the moving portion 22 is moved to the desired position, the transmission assembly 60 may change or return to the engaged state so that the transmission assembly 60 engages the gearbox assembly 52, as represented by operation 214.

In operation 216, the controller 24 may query whether the position of the moving portion 22 with respect to the end stops 30, 32 is known. As mentioned above, the first end stop 30 may correspond to the first position and the second end stop 32 may correspond to the second position. If the controller 24 knows the relative position of the moving portion 22, the controller 24 may branch to operation 220 to operate in the de-normalized state or to operation 218 and operate in the normalized state. Because the controller 24 receives location data from the sensor 28 that monitors or measures positional data of the motor 26 and because the sensor 28 does not measure positional information when the motor 26 is not actuated, position data is not measured or recorded. Accordingly, the controller 24 may not know the position of the moving portion 22 with respect to the end stops 30, 32.

When the controller 24 operates in the normalized state, as represented by operation 218, the controller 24 may operate the motor 26 at first operating speed. And when the controller 24 operates in the de-normalized state, as represented by operation 220, the controller 24 may command the motor 26 to operate at a second operating speed, that may be less than the first operating speed. As another example, the controller 24 may command the motor 26 to operate for a predetermined period of time so that the moving portion 22 incrementally moves between the first and second positions.

Decreasing the speed of the moving portion 22 may provide a number of advantages for detecting and mitigating a pinch condition. For example, decreasing the speed of the motor 26 may facilitate a more accurate detection of the motor position increments with respect to time. Because the motor is rotating slower in the de-normalized state, additional time to detect and respond to motor position increments exceeding the threshold. The threshold may be altered in the de-normalized state, so that fewer motor position increments with respect to time detect the pinch condition, as represented in operation.

As another example of the advantages associated with the de-normalized state, decreasing the rotational speed of the motor 26 decreases the inertia of the motor 26 after the motor is stopped. The rotational speed of the motor 26 in the normalized state may be higher than the rotational speed of the motor 26 in the de-normalized state and as such, the inertia of the motor 26 after the motor 26 is stopped in the normalized state may be greater than the inertia of the motor 26 after the motor 26 is stopped in the de-normalized state. As the inertia of the motor 26 decreases, the quicker the pinch condition may be terminated, and the force applied between the moving portion 22 and the fixed portion 20 may be reduced.

In operation 222, the controller 24 may determine whether a command is received, for example in response to actuation of the switch 42, to actuate the gearbox assembly 52 within a predetermined time. The predetermined time may range from 1 to 120 minutes. If such a command is not received within the predetermined time, the controller 24 may branch to determine whether the vehicle 10 is in standby mode, as represented by operation 224. The vehicle 10 may be in standby mode in response to a number of events, such as a key-off event or the vehicle 10 being placed in park. As another example, the vehicle 10 may move to standby mode if one or more occupants are not detected within the vehicle 10 or if a key fob associated with the vehicle 10 is not within a predetermined distance of the vehicle 10.

If the vehicle 10 is in standby mode or if a command to operate the gearbox assembly 52 has not been received for a predetermined period of time, the controller 24 may be programmed to assume that the vehicle 10 is not occupied and that one or more users may subsequently enter the vehicle 10. When the moving portion 22 is disposed between the first position 30 and the second position 32, users entering the unoccupied vehicle may desire that the moving portion 22 be moved to the first position so that the moving portion 22 does not obstruct the ingress of one or more users attempting to reach the second or third row seats of the vehicle 10, as represented by operation 226. In operation 226, the controller 24 may operate in normalized state and the de-normalized state. The decreasing the speed of the motor 26 in the de-normalized state may require less energy and conserve a charge level of one or more vehicle batteries.

If a command is received by the controller 24 to provide power movement to the moving portion 22 with a predetermined time, the controller 24 may branch to operation 228. In operation 228, the controller 24 may operate in the de-normalized state to move the moving portion to a desired location.

In operation 230, the controller 24 may determine whether an object is disposed between the moving portion 22 and the fixed portion 20 and whether such an object will result in a pinch condition. A pinch condition may refer to a portion of a user disposed between the moving portion 22 and the fixed portion 20. The controller 24 may determine whether an obstacle is detected based on a number of motor position increments exceeding a time threshold. As another example, one or more sensors (not illustrated) such as a capacitive sensor or a radar sensor may provide data indicative of recognition of the obstacle to the controller 24.

If an obstacle is detected and/or if a pinch condition is predicted or detected, the controller 24 may command the gearbox assembly 52 to stop, or reverse, or both to prevent the moving portion 22 from pinching the detected object. As another example, the disengaging device 62, may change from the operating state to the disengaged state. The controller 24 may branch to operation 234 to end the control method.

Figure 9:
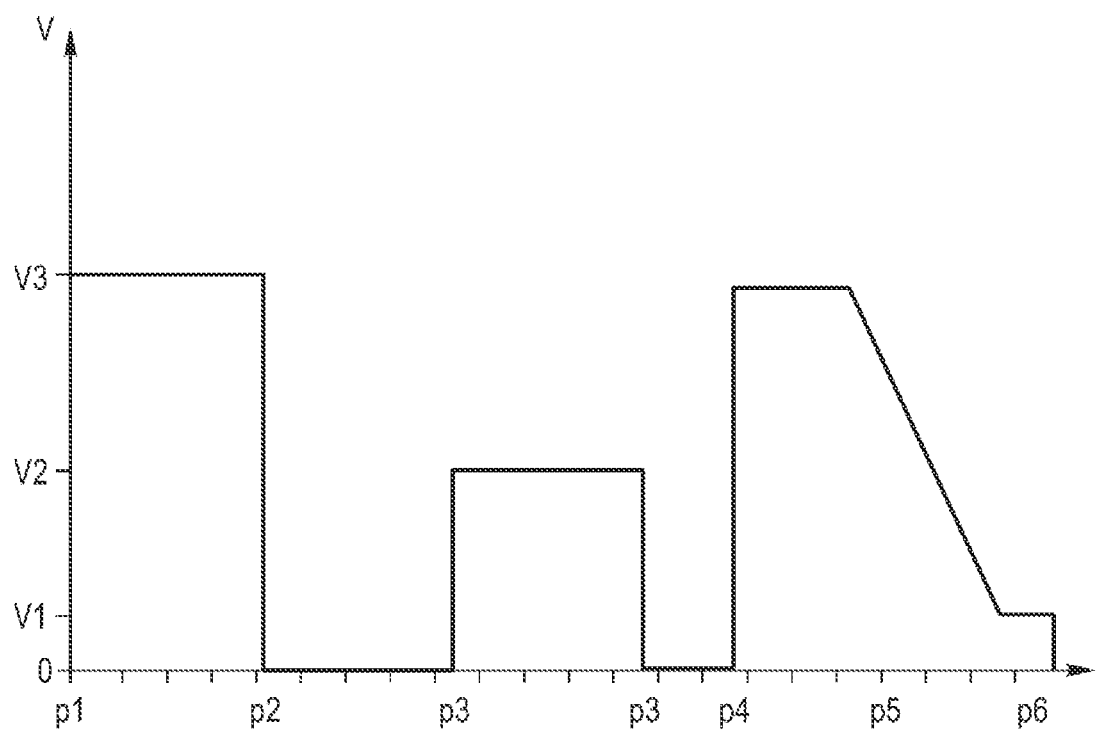
FIG. 9 is an exemplary graph of speed or velocity of a moving portion of the interior assembly with respect to time or relative position of the same.

FIG. 9 is an exemplary graph of speed or velocity of a moving portion 22 of the interior assembly with respect to time or relative position of the same. The y-axis of the graph may represent velocity that may be measured in millimeters per second. The x-axis of the graph may represent time measured in seconds.

Between points p1 and p2, when the controller is in a normalized state, the moving portion 22, may move at a velocity V3. In response to one or more conditions, a user may stop the actuation of the motor 26 to stop the moving portion 22 at or between the first and second positions 30, 32, and the moving portion may be moved, by the user or another means, without actuation of the motor 26. As stated above, the controller 24 receives location data from the sensor 28 that monitors or measures positional data of the motor 26. Because the position data after manual or other movement of the moving portion 22, while the transmission assembly 60 is in the disengaged state, the positional data from the sensor 28 may not be monitored or measured.

As another exemplary condition, electricity to the controller 24 and motor 26 may be cut off as the moving portion 22 is moving so that the moving portion 22 stops and an error or memory loss event may occur. In response to the controller receiving power and a command to move the moving portion 22, the controller 24 may change to the de-normalized state and alert a user of the same. As previously mentioned, alerting the user may be accomplished by reducing the speed of the moving portion 22 from V3 to V2, as illustrated between points p3 and p4. If the controller changes from the de-normalized state to the normalized state and if the moving portion 22 is within a predetermined distance of either of the end stops 30, 32, the moving portion may decelerate from V3 to V1 as illustrated between points p6 and p7. After the moving portion 22 reaches the speed of V1, the moving portion 22 may be stopped.

Figure 10:
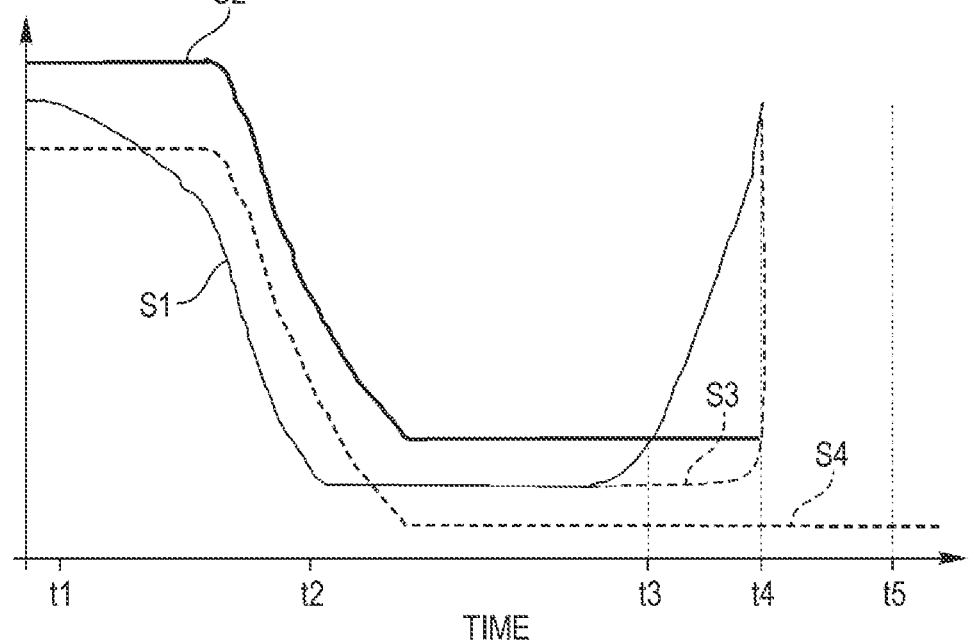
FIG. 10 is an exemplary graph of change in rotational speed of a motor or moving portion with respect to time.

FIG. 10 is an exemplary graph of change in rotational speed of a motor 26 or moving portion 22 with respect to time. The y-axis may generally represent motor position increments and the x-axis may represent time that may be measured in milli-seconds or seconds. As one example, the motor position increments may be based on the rotational speed of the motor 26, such as an amount of time between a first reference point and a second reference point of a motor. As mentioned above, the sensor 28 may be a hall pulse sensor configured to detect the presence of the first and second reference points, such as portions of a magnet within the motor 26 and record the amount of time between the detection of the first and second reference points. As another example, the motor position increments may be based on counting ripples of the motor 26. As yet another example, other data indicative of speed of the moving portion 22, or the motor 26, or some combination thereof may be employed.

Line S1 of the exemplary graph may represent measured motor position increments, such as the rotational speed of the motor 26. Line S2 may represent a threshold of motor position increments, such as the rotational speed of the motor 26, that may be pre-programmed into the controller 24. While only one threshold line S2 is shown, one of ordinary skill in the art will appreciate that multiple threshold lines S2 may be employed. For example, line S4 may represent a second threshold of motor position increments when the controller 24 is in the de-normalized state. Line S4 may define threshold values that may be lower or less than those threshold values associated with the normalized state. Lowering the threshold may be advantageous if the moving portion 22 is moving at a lower speed in the de-normalized state as compared to the speed in the normalized state. If the motor 26 is rotating at the lower speed, the number of motor position increments within the period will be less than the number of motor position increments of the motor 26 rotating at the higher speed. Because the sensor 28 and controller 24 are receiving fewer data points, the controller 24 and sensor 28 may have a higher resolution and more be more accurate in determining a pinch condition or end position.

Line S3 may also represent measured motor position increments. Because line S1 substantially overlaps line S3 up until a point before t3, only a portion of line S3 is illustrated.

As the motor 26 is first actuated, the time between the motor increments may be relatively high and gradually decrease as represented by line S1 between t1 and t2. After reaching t2, the rotational speed of the motor 26 may be relatively constant as represented by line S1 between t2 and before t3. As line S1 intersects line S2 at point t3, the motor position increments exceed the threshold defined by S2 and be representative of a pinch condition or the moving portion 22 reaching an end stop 30, 32. As line S3 intersects line S2 at point t4, the motor position increments exceed the threshold defined by S2 and be representative of a pinch condition or the moving portion 22 reaching an end stop 30, 32. As the moving portion contacts in obstacle or an end stop 30, 32, additional torque on the motor 26 may be required to propel the moving portion 22 against the obstacle. Because of the resistance or force applied by the obstacle or the end stop 30, 32, the rotational speed of the motor 26 may decrease. This decrease in rotational speed or increase in time between motor position increments may be indicative of an obstacle or the end stop 30, 32.

In one or more embodiments, the controller 24 may be configured to determine the rate of change in the rotational speed or time between the motor position increments to distinguish between an obstacle and the end stop 30, 32. This is generally possible if the mechanism coupled to the motor 26 is relatively stiff and generally resistant to deformation. As illustrated by the sharp rate of change of line S3 at time t4, the rotational speed of the motor 26 decreases faster than the rate of change of the rotational speed of line S1 just before t3 to t4. Because an obstacle is generally deformable, the rate of change in rotational speed of the motor 26 in line S1 is less than the rate of change in S3. As mentioned above, the controller 24 may reverse the rotational direction of the motor 26 in response to detection of an obstacle and in response to detection of the end stop 30, 32, the controller 24 may stop the motor 26.

Between t4 and t5, the motor 26 controller 24 may continue providing signals to the motor 26 continue rotating the motor 26 but the torque required to rotate the motor 26 may be insufficient and the motor 26 may be stalled. Stalling the motor 26 against the end stops 30, 32 or an obstacle may not be desirable. As one example, waiting for the motor 26 to stall in a pinch condition may not provide sufficient safety protection to users of the console assembly 14. As another example, relying on the stall condition may cause excessive wear or deformation to the motor 26, mechanism, or moving portion 22.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

10 vehicle
12 vehicle floor
14 console assembly
16 driver's seat
18 passenger seat
20 fixed portion
22 moving portion
23 space
24 controller
26 motor
28 sensor
30 first end stop, first position
32 second end stop, second position
34 reference point
36 signals
38 display
42 console switch
44 dashed line
46 dashed line
50 guide member
52 gearbox assembly
58 pinion
60 transmission assembly
62 disengaging device
64 rack
66 teeth
70 pins
72 springs
78 handle
80 disengaging cable
82 first end
84 second end
86 drum housing
87 solenoid
88 cable drum
89 button
90 cables
92 rod
94 first end
96 second end
98 flange
100 first spring
102 second spring
104 pin
106 first end
108 second end
110 aperture
112 disengaging device sensor
114 return spring
116 slot
120 pin
122 gearbox housing
124 position sensor
126 return spring (moving portion)
130 carrier
132 rails
200 flow chart
202-234 operations

What is claimed is:

1. A console assembly for use in a vehicle provided with a floor, the console assembly comprising:
   a guide member configured to be coupled to the floor;
   a moving portion;
   a gearbox assembly including a gear configured to rotate about a rotational axis in a first rotational direction and a second rotational direction to move the moving portion between a first position and a second position along the guide member;
   a transmission assembly including a rack provided with a plurality of teeth and configured to operate in a number of operating states including an engaged state, in which the plurality of teeth engage the gear, and a disengaged state in which one or more teeth of the plurality of teeth do not engage the gear; and
   a disengaging device configured to change the operating state of the transmission assembly between the engaged state and the operating state so that the moving portion is movable while the transmission assembly is in the disengaged state.

2. The console assembly of claim 1, wherein the transmission assembly includes,
a first cable coupled to the moving portion, and
a cable drum configured to wind and unwind the first cable to move the moving portion along the guide member.

3. The console assembly of claim 2, wherein the disengaging device includes a second cable coupled to the gearbox assembly and configured to move the gearbox assembly away from the transmission assembly or move the transmission assembly away from the gearbox assembly.

4. The console assembly of claim 3, wherein the second cable is configured to move the gearbox assembly in a direction parallel to the rotational axis.

5. The console assembly of claim 2, further comprising:
a rod extending through the gearbox assembly and the transmission assembly, wherein the gearbox assembly or the transmission assembly is configured to translate along the rod to change the operating state of the transmission assembly between the engaged state and the operating state.

6. A console assembly for use in a vehicle, the console assembly comprising:
a guide member;
a rack defining a plurality of teeth;
a moving portion coupled to the rack and configured to move along the guide between a first position and a second position;
a gearbox assembly including a pinion configured to rotate about a rotational axis in a first or second direction to translate the carrier member along the guide from a first position to a second position; and
a disengaging device configured to move the rack and to selectively disengage one or more teeth of the plurality of teeth from the pinion, so that the carrier moveable along the guide while one or more teeth of the plurality of teeth are selectively disengaged from the pinion.

7. The console assembly of claim 6, wherein the rack moves along a direction transverse to the rotational axis.

8. The console assembly of claim 7, further comprising:
further comprising a spring configured to engage and bias the rack towards the gearbox assembly.

9. The console assembly of claim 7, further comprising:
a mounting member configured to support the guide member; and
a pin extending from the carrier member or the mounting member, wherein the rack defines a slot, wherein the slot moves along the pin as the one or more teeth selectively disengage the pinion.

10. The console assembly of claim 6, further comprising a pin extending from the carrier member or the mounting member, wherein the rack is configured to pivot about the pin so that at least some of the plurality of teeth disengage the pinion.

11. The console assembly of claim 6, wherein the disengaging device includes a handle and a cable, wherein a first end of the cable is coupled to the handle and the a second end of the cable is fixed to the rack and actuation of the handle pulls the cable to selectively disengage the one or more teeth of the plurality of teeth from the pinion.

12. The console assembly of claim 11, wherein the handle is fixed to the moving portion.

13. The console assembly of claim 6, wherein the disengaging device includes,
a switch and an electromechanical actuator operatively connected to the switch and the rack, wherein the electromechanical actuator is configured to move the rack in response to actuation of the switch.

14. The console assembly of claim 6, further comprising:
a return spring fixed to the moving portion and configured to move the moving portion to the from the second position to the first position.

15. A console assembly comprising:
a guide member;
a moving portion configured to move along the guide member between a first position and a second position;
a gearbox assembly including a gear and a motor configured to rotate the gear about a rotational axis in a first rotational direction and a second rotational direction to move the moving portion between the first position and the second position;
a transmission assembly configured to operate in a number of operating states including an engaged state and a disengaged state, the transmission assembly including a cable and a cable drum, the cable coupled to the moving portion;
a disengaging device configured to actuate and change the operating state of the transmission assembly between the engaged state and the operating state so that the moving portion is movable, wherein the cable drum is configured to wind and unwind the cable to move the moving portion along the guide member; and
a controller configured to, responsive to movement of the moving portion from the second position to the first position or another position disposed between the first and second positions, store position data indicative of a position of the moving portion.

16. The console assembly of claim 15, wherein the controller is further configured to stop the motor in response to:
(1) the gearbox assembly rotating in the first rotational direction,
(2) the moving portion moving to the first position, and
(3) a number of motor position increments exceeding a first threshold within a time period.

17. The console assembly of claim 15, wherein the controller is further configured to change from a normalized state to a de-normalized state, wherein when the controller is in the normalized state, the controller is configured to command the motor to move the moving portion at a first speed, and when the controller is in the de-normalized state, the controller is configured to command the motor to move the moving portion at a second speed, wherein the second speed is less than the first speed.

18. The sliding center console of claim 15, wherein disengaging device includes a switch configured to provide a disengaging signal to the controller in response to actuation of the disengaging device, wherein the controller is further configured to, responsive to receiving the disengaging signal, change from a normalized state to a de-normalized state.

19. The sliding center console of claim 15, further comprising:
a fixed portion, wherein in the first position, the moving portion lies against or is spaced apart from the fixed portion by a first distance and in the second position, the moving portion is spaced apart from the fixed portion by a second distance greater than the first distance; and
a position sensor configured to provide a position signal, indicative of a position with respect to the fixed portion.

20. The console assembly of claim 15, wherein the transmission assembly includes a rack provided with a plurality of teeth, wherein when the transmission assembly is in the engaged state, one or more teeth of the plurality of teeth engage the gear and when the transmission assembly is in the disengaged state, one or more teeth of the plurality of teeth do not engage the gear.

\* \* \* \* \*